(12) United States Patent
Xu et al.

(10) Patent No.: US 11,528,068 B2
(45) Date of Patent: Dec. 13, 2022

(54) SYSTEM AND METHOD FOR MASSIVE MIMO COMMUNICATION

(71) Applicants: Innophase, Inc., San Diego, CA (US); Parallel Wireless, Inc., Nashua, NH (US)

(72) Inventors: Yang Xu, San Diego, CA (US); Steven Paul Papa, Windham, NH (US)

(73) Assignees: Innophase, Inc., San Diego, CA (US); Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 17/264,776

(22) PCT Filed: Jul. 30, 2019

(86) PCT No.: PCT/US2019/044246
§ 371 (c)(1),
(2) Date: Jan. 29, 2021

(87) PCT Pub. No.: WO2020/028438
PCT Pub. Date: Feb. 6, 2020

(65) Prior Publication Data
US 2021/0297131 A1    Sep. 23, 2021

Related U.S. Application Data

(60) Provisional application No. 62/712,172, filed on Jul. 30, 2018.

(51) Int. Cl.
*H04B 7/06*   (2006.01)
*H04B 7/0417*   (2017.01)
*H04B 7/08*   (2006.01)

(52) U.S. Cl.
CPC ......... *H04B 7/0617* (2013.01); *H04B 7/0417* (2013.01); *H04B 7/0848* (2013.01)

(58) Field of Classification Search
CPC .................................................. H04B 7/0617
(Continued)

(56) References Cited

U.S. PATENT DOCUMENTS

| 852,424 A | 5/1907 | Edison |
| 4,527,163 A | 7/1985 | Stanton |

(Continued)

FOREIGN PATENT DOCUMENTS

| EP | 0349069 A1 | 1/1990 |
| EP | 2911323 A1 | 8/2015 |

(Continued)

OTHER PUBLICATIONS

International Search Report and Written Opinion for PCT/US2019/044246, dated Oct. 22, 2019, 1-12 (12 pages).

(Continued)

*Primary Examiner* — Lihong Yu
(74) *Attorney, Agent, or Firm* — Invention Mine LLC

(57) ABSTRACT

Methods disclosed herein may include configuring a plurality of transceiver modules in an antenna array with assigned receive signal weighting factors, the transceiver modules interconnected with high-speed data communication buses, and each transceiver module positioned adjacent to a respective antenna element in the antenna array; configuring the plurality of transceiver modules into inter-communicating module groups by enabling the associated high-speed data communication buses; receiving a plurality of wireless data signals with the plurality of transceiver modules and responsively generating a corresponding plurality of receive baseband data signals; generating a plurality of received beamformed signals by combining subsets of the receive baseband signals within each module group using the assigned receive signal weighting factors by transmitting the receive baseband signals between the transceiver modules (Continued)

700 within the module group; and demodulating the received beamformed signals.

13 Claims, 14 Drawing Sheets

(58) Field of Classification Search
USPC .......................................................... 375/267
See application file for complete search history.

(56) References Cited

U.S. PATENT DOCUMENTS

| | | |
|---|---|---|
| 5,268,701 A | 12/1993 | Smith |
| 5,534,880 A | 7/1996 | Button et al. |
| 5,809,422 A * | 9/1998 | Raleigh ............... H04B 7/2609 455/444 |
| 5,895,405 A | 4/1999 | Inderbitzen |
| 6,362,796 B1 | 3/2002 | Bohlman |
| 7,058,844 B2 | 6/2006 | Wiley et al. |
| 7,085,544 B2 | 8/2006 | Takano et al. |
| 7,109,791 B1 | 9/2006 | Epperson et al. |
| 7,248,842 B2 | 7/2007 | Takano et al. |
| 7,280,848 B2 | 10/2007 | Hoppenstein |
| 7,433,653 B2 | 10/2008 | Takano et al. |
| 7,656,360 B2 | 2/2010 | Hirabayashi |
| 8,489,041 B2 | 7/2013 | Teillet et al. |
| 8,498,601 B2 * | 7/2013 | Horng ................. H04B 1/0039 455/265 |
| 8,698,696 B1 | 4/2014 | McCandless |
| 8,829,993 B2 | 9/2014 | Briffa et al. |
| 8,867,418 B2 | 10/2014 | Mishra et al. |
| 8,873,677 B1 | 10/2014 | Loh et al. |
| 8,879,416 B2 | 11/2014 | Mishra et al. |
| 9,107,092 B2 | 8/2015 | Agarwal et al. |
| 9,113,352 B2 | 8/2015 | Agarwal et al. |
| 9,160,287 B2 | 10/2015 | Briffa et al. |
| 9,172,336 B2 | 10/2015 | Briffa et al. |
| 9,232,547 B2 | 1/2016 | Mishra et al. |
| 9,438,278 B2 | 9/2016 | Barker et al. |
| 9,455,959 B1 | 9/2016 | Sarg et al. |
| 9,513,361 B1 | 12/2016 | Elsallal et al. |
| 9,568,601 B1 | 2/2017 | Xu et al. |
| 9,615,266 B1 | 4/2017 | Cheadle et al. |
| 9,641,206 B2 | 5/2017 | Pratt et al. |
| 9,735,940 B1 | 8/2017 | Bakr et al. |
| 9,973,943 B2 | 5/2018 | Lysejko et al. |
| 9,991,607 B1 | 6/2018 | West et al. |
| 10,108,148 B1 | 10/2018 | Testi |
| 10,145,230 B2 | 12/2018 | Dacunha |
| 10,148,230 B2 | 12/2018 | Xu et al. |
| 10,164,577 B2 | 12/2018 | Briffa et al. |
| 10,218,389 B2 | 2/2019 | Huang et al. |
| 10,256,847 B2 | 4/2019 | Choi et al. |
| 2002/0135514 A1 | 9/2002 | Yoshida |
| 2002/0180655 A1 | 12/2002 | Mohuchy et al. |
| 2003/0224740 A1 | 12/2003 | Takano et al. |
| 2004/0125038 A1 | 7/2004 | Diximus et al. |
| 2004/0198257 A1 | 10/2004 | Takano et al. |
| 2004/0202255 A1 | 10/2004 | Dallal |
| 2005/0179615 A1 | 8/2005 | Mrstik et al. |
| 2006/0217081 A1 | 9/2006 | Takano et al. |
| 2006/0256024 A1 | 11/2006 | Collinson |
| 2007/0019748 A1 | 1/2007 | Hoo et al. |
| 2007/0040758 A1 | 2/2007 | Dwyer et al. |
| 2007/0249297 A1 | 10/2007 | Takano et al. |
| 2008/0026697 A1 | 1/2008 | Signell et al. |
| 2009/0011730 A1 | 1/2009 | Liang et al. |
| 2009/0036064 A1 | 2/2009 | Ravi et al. |
| 2009/0103593 A1 | 4/2009 | Bergamo |
| 2009/0153425 A1 | 6/2009 | Le et al. |
| 2009/0160707 A1* | 6/2009 | Lakkis ................. H04B 7/0417 342/367 |
| 2009/0233644 A1 | 9/2009 | Mccune |
| 2009/0259864 A1 | 10/2009 | Li et al. |
| 2010/0040184 A1 | 2/2010 | Haralabidis et al. |
| 2010/0048196 A1 | 2/2010 | Georgantas et al. |
| 2010/0090745 A1 | 4/2010 | Kousai et al. |
| 2010/0091900 A1 | 4/2010 | Gan |
| 2010/0136935 A1 | 6/2010 | Plevridis |
| 2010/0253426 A1 | 10/2010 | Su et al. |
| 2011/0129037 A1 | 6/2011 | Staszewski et al. |
| 2012/0071112 A1 | 3/2012 | Rofougaran |
| 2012/0200355 A1 | 8/2012 | Braithwaite |
| 2012/0212197 A1 | 8/2012 | Fayed et al. |
| 2012/0286866 A1 | 11/2012 | Khanifar et al. |
| 2012/0286868 A1 | 11/2012 | Haroun et al. |
| 2013/0082772 A1 | 4/2013 | Seddighrad et al. |
| 2013/0106667 A1 | 5/2013 | Fenn et al. |
| 2013/0143509 A1 | 6/2013 | Horng et al. |
| 2013/0200950 A1 | 8/2013 | Bai |
| 2013/0235807 A1 | 9/2013 | Lee et al. |
| 2013/0243121 A1 | 9/2013 | Bai |
| 2014/0035677 A1 | 2/2014 | Chen et al. |
| 2014/0049318 A1 | 2/2014 | Goswami |
| 2014/0118065 A1 | 5/2014 | Briffa et al. |
| 2014/0133456 A1 | 5/2014 | Donepudi et al. |
| 2014/0159835 A1 | 6/2014 | Lo Hine Tong et al. |
| 2014/0169496 A1 | 6/2014 | Yang et al. |
| 2014/0176385 A1 | 6/2014 | Apostolos et al. |
| 2014/0192768 A1 | 7/2014 | Yeh et al. |
| 2014/0233412 A1 | 8/2014 | Mishra et al. |
| 2015/0016567 A1 | 1/2015 | Chen |
| 2015/0094114 A1 | 4/2015 | Rao et al. |
| 2015/0098385 A1 | 4/2015 | Navalekar et al. |
| 2015/0098387 A1 | 4/2015 | Garg et al. |
| 2015/0116185 A1 | 4/2015 | Wang et al. |
| 2015/0229272 A1 | 8/2015 | Hur et al. |
| 2015/0288077 A1 | 10/2015 | Friedman et al. |
| 2016/0013762 A1 | 1/2016 | Sun et al. |
| 2016/0029430 A1 | 1/2016 | Mishra et al. |
| 2016/0044531 A1 | 2/2016 | Papa et al. |
| 2016/0065250 A1 | 3/2016 | Volokhine et al. |
| 2016/0099820 A1* | 4/2016 | Chakrabarti ............ H04L 27/00 375/232 |
| 2016/0105151 A1 | 4/2016 | Langer |
| 2016/0127003 A1 | 5/2016 | Xu et al. |
| 2016/0134337 A1 | 5/2016 | Branlund |
| 2016/0164474 A1 | 6/2016 | Beltran et al. |
| 2016/0172767 A1 | 6/2016 | Ray |
| 2016/0178731 A1 | 6/2016 | Stove |
| 2016/0204809 A1 | 7/2016 | Pratt et al. |
| 2016/0329631 A1 | 11/2016 | Rheinfelder et al. |
| 2017/0013513 A1 | 1/2017 | Agarwal et al. |
| 2017/0019375 A1 | 1/2017 | Garg et al. |
| 2017/0026845 A1 | 1/2017 | Garg et al. |
| 2017/0047667 A1* | 2/2017 | Sarkar ..................... H01P 5/16 |
| 2017/0048710 A1 | 2/2017 | Agarwal et al. |
| 2017/0055186 A1 | 2/2017 | Donepudi et al. |
| 2017/0064621 A1 | 3/2017 | Garg et al. |
| 2017/0070436 A1 | 3/2017 | Lubenski et al. |
| 2017/0077979 A1 | 3/2017 | Papa et al. |
| 2017/0085005 A1 | 3/2017 | Aue et al. |
| 2017/0111482 A1 | 4/2017 | Mishra et al. |
| 2017/0127409 A1 | 5/2017 | Mishra et al. |
| 2017/0171828 A1 | 6/2017 | Rao et al. |
| 2017/0181119 A1 | 6/2017 | Garg |
| 2017/0188286 A1 | 6/2017 | Yonekura et al. |
| 2017/0202006 A1 | 7/2017 | Rao et al. |
| 2017/0208560 A1 | 7/2017 | Papa et al. |
| 2017/0238278 A1 | 8/2017 | Yadav |
| 2017/0257133 A1 | 9/2017 | Papa et al. |
| 2017/0264251 A1 | 9/2017 | Cook et al. |
| 2017/0272330 A1 | 9/2017 | Cao et al. |
| 2017/0273068 A1 | 9/2017 | Choi et al. |
| 2017/0273134 A1 | 9/2017 | Cao et al. |
| 2017/0288813 A1 | 10/2017 | Khan et al. |
| 2017/0289833 A1 | 10/2017 | Heinikoski et al. |
| 2017/0295510 A1 | 10/2017 | Sharma et al. |
| 2017/0303163 A1 | 10/2017 | Sharma et al. |
| 2017/0347307 A1 | 11/2017 | Mehta et al. |
| 2018/0019711 A1 | 1/2018 | Wang et al. |
| 2018/0091195 A1 | 3/2018 | Carvalho et al. |
| 2018/0123950 A1 | 5/2018 | Garg et al. |
| 2018/0152865 A1 | 5/2018 | Atri et al. |

(56) References Cited

U.S. PATENT DOCUMENTS

| | | | |
|---|---|---|---|
| 2018/0175809 A1 | 6/2018 | Zai et al. |
| 2018/0279292 A1 | 9/2018 | Luo et al. |
| 2018/0287569 A1 | 10/2018 | Xu et al. |
| 2018/0299835 A1 | 10/2018 | Testi |
| 2019/0014585 A1 | 1/2019 | Mishra et al. |
| 2019/0123439 A1 | 4/2019 | Katz |
| 2019/0268028 A1 | 8/2019 | Papa et al. |
| 2019/0319367 A1 | 10/2019 | Edwards et al. |
| 2020/0091608 A1 | 3/2020 | Alpman et al. |
| 2020/0158859 A1 | 5/2020 | Morton |
| 2020/0187048 A1 | 6/2020 | Mishra et al. |
| 2020/0195755 A1 | 6/2020 | Mishra et al. |
| 2020/0274613 A1 | 8/2020 | Gao et al. |
| 2020/0280350 A1 | 9/2020 | Papa |
| 2020/0328785 A1 | 10/2020 | Lee et al. |
| 2022/0140842 A1 | 5/2022 | Chen et al. |

FOREIGN PATENT DOCUMENTS

| | | |
|---|---|---|
| JP | 2016511598 A | 4/2016 |
| WO | 2010056736 A2 | 5/2010 |
| WO | 2013105920 A2 | 7/2013 |
| WO | 2014178487 A1 | 11/2014 |
| WO | 2015124778 A1 | 8/2015 |
| WO | 2015185680 A1 | 12/2015 |
| WO | 2018060950 A1 | 4/2018 |
| WO | 2018091203 A1 | 5/2018 |

OTHER PUBLICATIONS

International Search Report and Written Opinion for PCT/US2019/059534, dated Mar. 18, 2020, 1-10 (10 pages).

Bjornson, Emil, et al., "What Type of Power Amplifiers are to be Used in Massive MIMO?", www.researchgate.net/post/, Mar. 19, 2018, 1-4 (4 pages).

Buckel, Tobias, et al., "A Novel Digital-Intensive Hybrid Polar-I/Q RF Transmitter Architecture", IEEE Transactions on Circuits and Systems-1, Regular Papers, vol. 65, No. 12, Dec. 2018, 4390-4403 (14 pages).

Chowdhury, Debopriyo, et al., "An Efficient Mixed-Signal 2.4-GHz Polar Power Amplifier in 65-nm CMOS Technology", IEEE Journal of Solid-State Circuits, vol. 46, No. 8, Aug. 2011, 1796-1809 (14 pages).

Li, Yan, et al., "A Review of Wideband Wide-Angle Scaning 2-D Phased Array and Its Applications in Satellite Communication", Journal of Communications and Information Networks, vol. 3, Issue 1, Mar. 2018, 21-30 (10 pages).

Liu, Dake, "Baseband ASIP design for SDR", China Communications, vol. 12, No. 7, 2015, 60-72 (13 pages).

McCune, E, et al., "A Fully Polar Transmitter for Efficient Software-Defined Radios", IEEE MTT-S International Microwave Symposium (IMS), Jun. 2017, 1-4 (4 pages).

Meyer, Peter, "Smart Basestation Antenna for Next Generation Mobile Communication", Airrays GmbH, Airrays Wireless Solutions Semicon Innovation Village, Oct. 6, 2015, 1-9 (9 pages).

Minard, P., et al., "Cost/Performance Optimized IEEE802.11A/B/G Front End With Integrated Antenna Diversity", First European Conference on Antennas and Propagation, EUCAP IEEE, Nov. 6, 2006, 1-6 (6 pages).

Sim, Min Soo, et al., "Nonlinear Self-Interference Cancellation for Full-Duplex Radios: From Link-Level and System-Level Performance Perspectives", IEEE Communications Magazine, vol. 55, No. 9, Sep. 2017, 158-167 (10 pages).

Yang, Zhenchao, et al., "High Efficiency Planar Arrays and Array Feeds for Satellite Communications", https://www.semanticscholar.org/paper/High-Efficiency-Planar-Arrays-and-Array-Feeds-for-Yang-Browning/914258c3ce37e3ac69392556f31d4359a0237277; Department of Electrical and Computer Engineering, Brigham Young University, 2015, 1-6 (6 pages).

Yao, Miao, et al., "A Digital Predistortion Scheme Exploiting Degrees-of-Freedom for Massive MIMO Systems", IEEE International Conference on Communications 2018, ArXiv:1801.06023v1, Jan. 18, 2018, 1-5 (5 pages).

Yu, W.-H., et al., "Low-complexity, full-resolution, mirror-switching digital predistortion scheme for polar-modulated power amplifiers". Electronic Letters, vol. 48, No. 24, Nov. 22, 2012, 1-2 (2 pages).

Chowdhury, Debopriyo, et al., "A Fully-Integrated Efficient CMOS Inverse Class-D Power Amplifier for Digital Polar Transmitters", IEEE Radio Frequency Integrated Circuits Symposium, 2011, 1-4 (4 pages).

Milne, Alex, "Understanding the Difference, and Debunking the Myths, Between Active and Passive Antennas", www.rfwirelessworld.com, 2014, 1-5 (5 pages).

\* cited by examiner

TRANSMITTING A SYNCHRONIZATION SIGNAL TO A PLURALITY OF TRANSCEIVER MODULES CONFIGURED IN AN ANTENNA ARRAY
902

EACH TRANSCEIVER MODULE PROCESSING THE SYNCHRONIZATION SIGNAL AND RESPONSIVELY ALIGNING A PHASE OF A RECEIVE CARRIER REFERENCE SIGNAL
904

900

CONFIGURING A PLURALITY OF TRANSCEIVER MODULES IN AN ANTENNA ARRAY WITH ASSIGNED RECEIVE SIGNAL WEIGHTING FACTORS, THE TRANSCEIVER MODULES INTERCONNECTED WITH HIGH-SPEED DATA COMMUNICATION BUSES, AND EACH TRANSCEIVER MODULE POSITIONED ADJACENT TO A RESPECTIVE ANTENNA ELEMENT IN THE ANTENNA ARRAY 1402

CONFIGURING THE PLURALITY OF TRANSCEIVER MODULES INTO INTER-COMMUNICATING MODULE GROUPS BY ENABLING THE ASSOCIATED HIGH-SPEED DATA COMMUNICATION BUSES 1404

RECEIVING A PLURALITY OF WIRELESS DATA SIGNALS WITH THE PLURALITY OF TRANSCEIVER MODULES AND RESPONSIVELY GENERATING A CORRESPONDING PLURALITY OF RECEIVE BASEBAND DATA SIGNALS 1406

GENERATING A PLURALITY OF RECEIVED BEAMFORMED SIGNALS BY COMBINING SUBSETS OF THE RECEIVE BASEBAND SIGNALS WITHIN EACH MODULE GROUP USING THE ASSIGNED RECEIVE SIGNAL WEIGHTING FACTORS BY TRANSMITTING THE RECEIVE BASEBAND SIGNALS BETWEEN THE TRANSCEIVER MODULES WITHIN THE MODULE GROUP 1408

DEMODULATING THE RECEIVED BEAMFORMED SIGNALS 1410

FIG. 14

SYSTEM AND METHOD FOR MASSIVE MIMO COMMUNICATION

CROSS-REFERENCE TO RELATED APPLICATIONS

The present application is a 35 U.S.C. 371 of International Application PCT/US2019/044246, entitled, "SYSTEM AND METHOD FOR MASSIVE MIMO COMMUNICATIONS," filed Jul. 30, 2019, which is a non-provisional filing of, and claims the benefit under 35 U.S.C. § 119(e) from, U.S. Provisional Patent Application Ser. No. 62/712,172, filed Jul. 30, 2018, which is hereby incorporated herein by reference in its entirety. The inventions described herein were made pursuant to a joint research agreement entered into between InnoPhase, Inc., and Parallel Wireless, Inc.

BACKGROUND

Some communication systems have high bill of material (BOM) costs and problems with heat sinks. Some communication systems also have a large number of components on a circuit board. Some communication systems also are inefficient with energy and have a large physical size.

SUMMARY

An example method in accordance with some embodiments may include: configuring a plurality of transceiver modules in an antenna array with assigned receive signal weighting factors, the transceiver modules interconnected with high-speed data communication buses, and each transceiver module positioned adjacent to a respective antenna element in the antenna array; configuring the plurality of transceiver modules into inter-communicating module groups by enabling the associated high-speed data communication buses; receiving a plurality of wireless data signals with the plurality of transceiver modules and responsively generating a corresponding plurality of receive baseband data signals; generating a plurality of received beamformed signals by combining subsets of the receive baseband signals within each module group using the assigned receive signal weighting factors by transmitting the receive baseband signals between the transceiver modules within the module group; and demodulating the received beamformed signals.

For some embodiments of the example method, each transceiver module may include a plurality of polar transmitters.

For some embodiments of the example method, each transceiver module may include a plurality of polar receivers, and wherein each polar receiver includes an injection locked oscillator.

Some embodiments of the example method may further include: obtaining a plurality of transmit digital baseband signals at the antenna array for transmission by the antenna array; distributing each transmit digital baseband signal to a respective plurality of transceiver modules; and applying a transmit signal weighting factor of the assigned signal weighting factors to the transmit digital baseband signal at each respective transceiver module.

Some embodiments of the example method may further include: generating a transmit modulated signal from the transmit digital baseband signal at each transceiver using a digital modulator and power amplifier; and combining the transmit modulated signals.

For some embodiments of the example method, the transmit modulated signals are combined with a Wilkinson combiner.

An example additional method in accordance with some embodiments may include: receiving a desired signal at an array of transceiver modules arranged on a panel array, each module positioned adjacent to an antenna element on the panel array, wherein each transceiver module comprises a plurality of digital demodulators, which may include a baseband signal combiner; generating a demodulated baseband modulated signal from each of the transceiver modules; and combining the digital baseband signals at the panel array using the baseband signal combiners.

For some embodiments of the example additional method, the signal combiners may be configured by a signal weighting factor.

For some embodiments of the example additional method, the signal weighting factor may include a beam forming weight.

For some embodiments of the example additional method, the beam forming weight may be a column weighting factor, a row weighting factor, or both.

An example apparatus in accordance with some embodiments may include: a plurality of transceiver modules in an antenna array, each transceiver having an assigned receive signal weighting factor, each transceiver module positioned adjacent to a respective antenna element in the antenna array; a plurality of high-speed data communication buses connected to the plurality of transceiver modules; a controller configured to transmit control signals to group the transceiver modules into inter-communicating module groups; a plurality of accumulators associated with the transceiver module groups configured to receive a plurality of receive baseband data signals and to apply the assigned receive signal weighting factors to form receive beamformed signals; and a demodulator configured to demodulate the received beamformed signals.

For some embodiments of the example apparatus, each transceiver module may include a plurality of polar transmitters.

For some embodiments of the example apparatus, each transceiver module may include a plurality of polar receivers, and wherein each polar receiver includes an injection locked oscillator.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 14 is a flowchart illustrating an example process for configuring a transceiver according to some embodiments.

Figure 1:
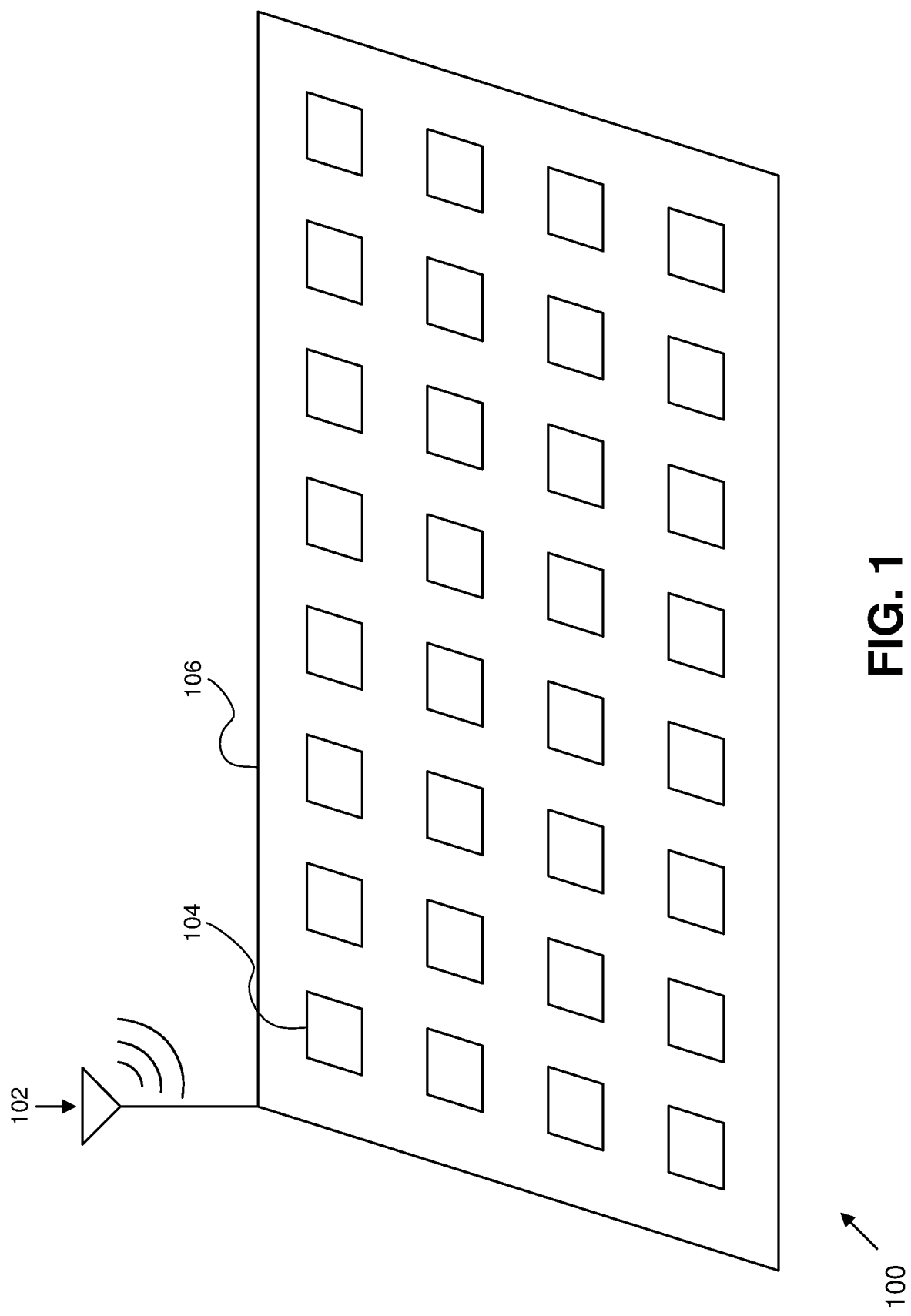
FIG. 1 is a schematic perspective view illustrating a matrix array of Software-Defined Radio (SDR) modules for an SDR system 100 according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—may only properly be read as being constructively preceded by a clause such as "In at least one embodiment, . . . ." For brevity and clarity of presentation, this implied leading clause is not repeated ad nauseum in the detailed description of the drawings.

DETAILED DESCRIPTION

FIG. 1 is a schematic perspective view illustrating a matrix array of Software-Defined Radio (SDR) modules for an SDR system 100 according to some embodiments. FIG. 1 shows an example 4×8 matrix of SDR modules 104 on a circuit board 106. Some embodiments have other matrix configurations of SDR modules 104. Each SDR module may include a 4×4 matrix of sub-array transceiver elements. For some embodiments, an SDR module 104 may include a tunable radio digital-to-analog converter (DAC)/analog-to-digital-to-analog converter (ADAC), an RF switch (time division duplex (TDD) and frequency division duplex (FDD)), a digital power device (DPD), a power amplifier for each sub-array set of transceiver elements.

A MIMO transceiver circuit board 106 may include an RF antenna 102 according to some embodiments. The RF antenna 102 may be used to transmit a synchronization control signal to each SDR module 104. The synchronization control signal may be a signal that is transmitted with a center carrier frequency near the center of a desired receive channel. For some embodiments, the synchronization control signal may be an information signal that is used to determine the oscillator frequency for injection locked oscillator circuits associated with each SDR module 104.

Some embodiments may have the oscillator circuit integrated with each SDR module 104, and some embodiments may have part of the oscillator circuit external to an SDR module 104. In some embodiments, one RF antenna 102 is attached to a MIMO circuit board 106 or a housing associated therewith. Some embodiments of the MIMO circuit board 106 may have multiple RF antennas 102, such as, for example, one RF antenna 102 in multiple corners of the MIMO circuit board 106. For example, the MIMO circuit board 106 may have an RF antenna 102 in each corner. A subset of the matrix of SDR modules may be assigned to each RF antenna 102.

For some embodiments, a row or column of the matrix array of SDR modules 104 may be used to perform beamforming. For example, a row of eight SDR modules 104 may be used to create a phased-array transmit beam. An oscillator circuit associated with each SDR module 104 may use amplitude and phase and/or in-phase (I) and quadrature (Q) weightings to account for propagation delays, timings, and/or other geometries between the location of an RF antenna 102 and the antenna(s) used by each SDR module 104.

With some embodiments, a calibration routine may be used to determine relative propagation delays for each SDR module 104. Some embodiments may use a run-time calibration routine that may continually adjust weightings. Some embodiments may use a calibration routine that configures weightings at power-up time. With some embodiments, a calibration look-up table may be used for a particular configuration of a circuit board 106.

Figure 2A:
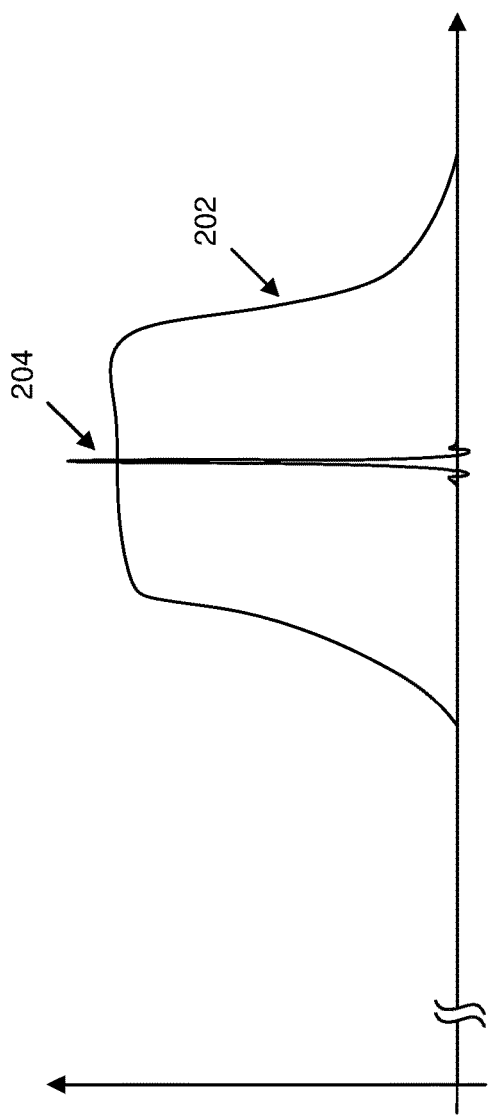
FIG. 2A is a graph of an example frequency response 200 illustrating an RF synchronization control signal positioned in the center of an OFDMA channel according to some embodiments.

FIG. 2A is a graph of an example frequency response 200 illustrating an RF synchronization control signal positioned in the center of an OFDMA channel according to some embodiments. The frequency response of an orthogonal frequency division multiple access (OFDMA) receive (Rx) signal 202 is shown in FIG. 2A for a particular channel. An synchronization control signal 204 may have a center carrier frequency that is nearly equal to a center carrier frequency of the OFDMA Rx signal 202 for a channel.

Figure 2B:
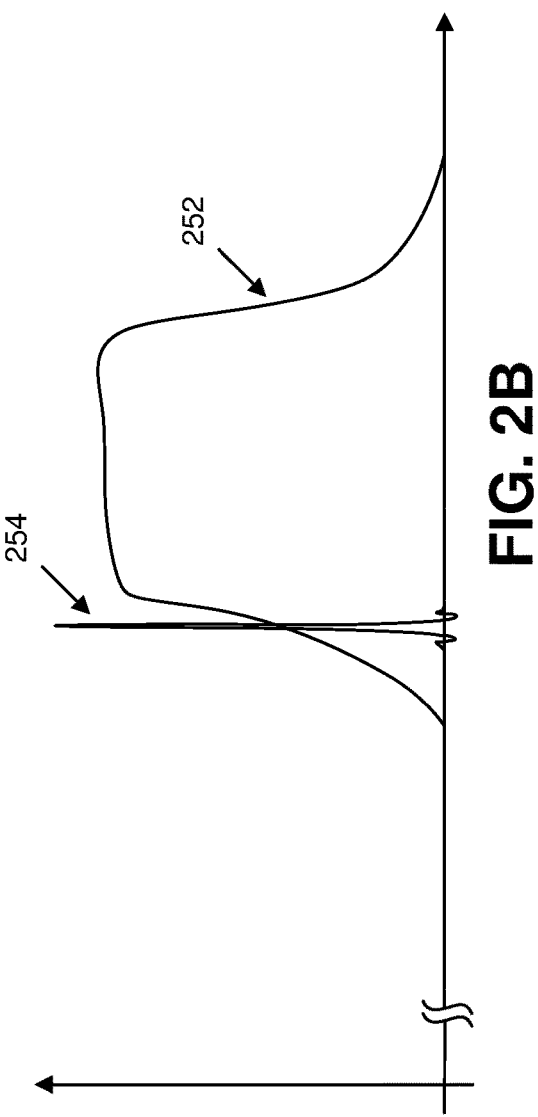
FIG. 2B is a graph of an example frequency response 250 illustrating an RF synchronization control signal positioned at the edge of an OFDMA RF channel signal according to some embodiments.

FIG. 2B is a graph of an example frequency response 250 illustrating an RF control signal positioned at the edge of an OFDMA RF channel signal according to some embodiments. Similar to FIG. 2A, the frequency response of an OFDMA Rx signal 252 is shown in FIG. 2B for a particular channel. An oscillator control signal 254 may have a center carrier frequency equal to a frequency associated with the channel, such as a frequency near the bottom of the OFDMA channel. Some embodiments may have an oscillator control signal transmitted using a center carrier frequency in-between (for example) the examples shown in FIGS. 2A and 2B. Some embodiments may have an oscillator control signal transmitted using a center carrier frequency higher or lower the than the center carrier frequency of the oscillator control signals 204, 254 shown in FIGS. 2A and 2B.

Figure 3:
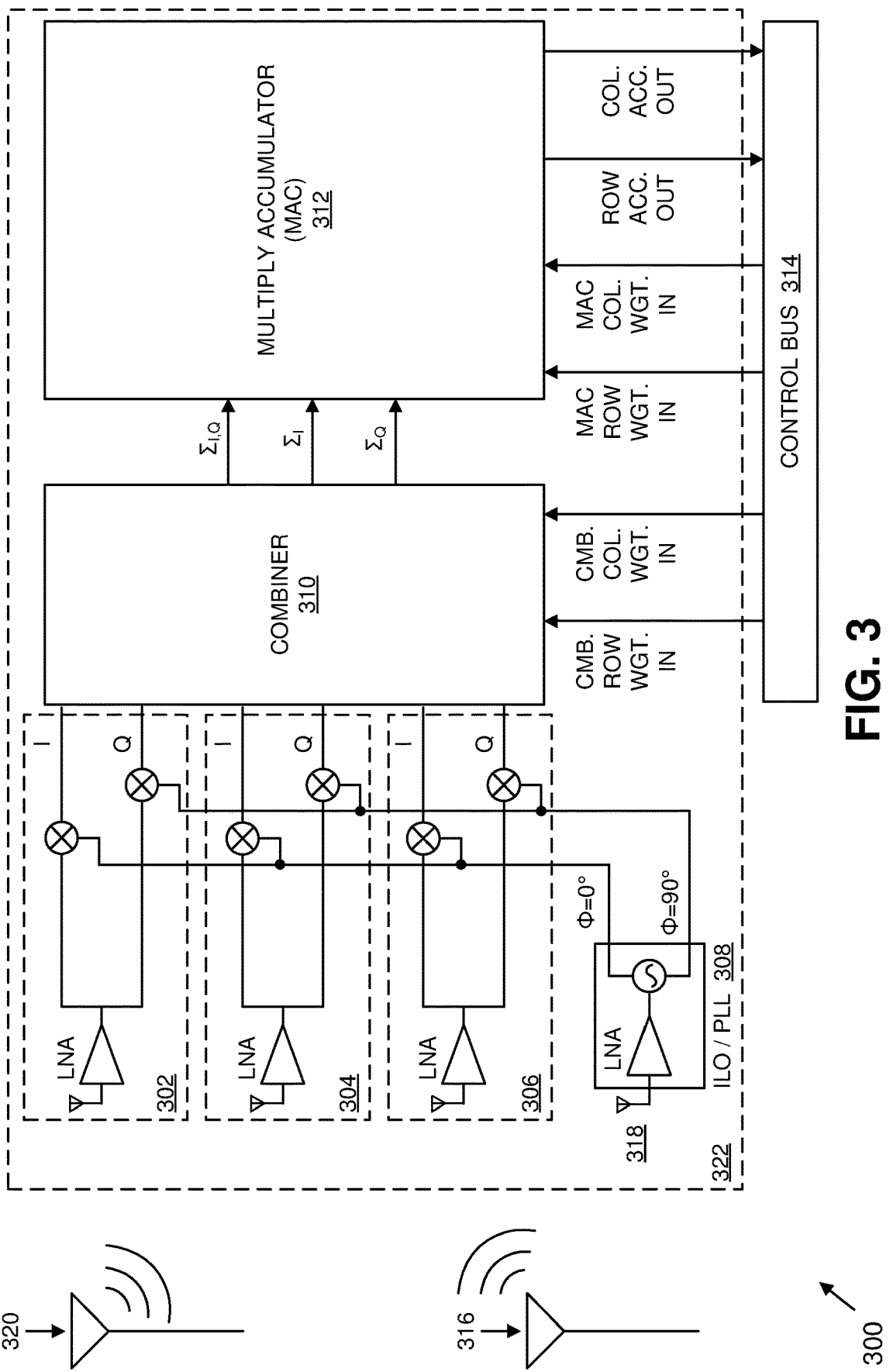
FIG. 3 is a block diagram illustrating block circuit connections for I/Q receiver chain elements according to some embodiments.

FIG. 3 is a block diagram 300 illustrating block circuit connections for I/Q receiver chain elements according to some embodiments. An oscillator control signal may be transmitted by an RF antenna 320, which may be common to one or more SDR modules, and received by an oscillator circuit antenna 318. The RF antenna 320 of FIG. 3 may be the same as the RF antenna 102 of FIG. 1 for some embodiments. The received oscillator control signal may be received by an input to an injection locked oscillator (ILO) or phase-locked loop (PLL) circuit 308. Some embodiments of the SDR module 322 may have a common ILO/PLL circuit 308. For some embodiments, a linear noise amplifier (LNA) may inject the received signal into an oscillator sub-circuit. Oscillator control signals with phases of 0 and 90 degrees may be output by the oscillator sub-circuit. These 0 and 90 degree phase signals may be used by mixers associated with the respective I and Q circuit elements for each receive chain sub-module 302, 304, 306.

With some embodiments of a receive chain sub-module 302, 304, 306, an RF antenna associated with a receive chain sub-module 302, 304, 306 may receive an OFDMA signal transmitted by an external transmitter/antenna 316. The external transmitter 316 may be a cell phone tower Tx antenna or a Tx antenna attached to a satellite, for example. The OFDMA receive signal may propagate through an LNA and be split into I and Q path phase signals. Each I and Q path phase signal may be mixed with the oscillator control signals with phases of 0 and 90 degrees, respectively to generate I and Q signals for each receive chain sub-module 302, 304, 306.

For some embodiments, each receive chain sub-module 302, 304, 306 may output I and Q signals that are input to a combiner 310. While FIG. 3 shows three receive chains sub-modules 302, 304, 306, some embodiments of an SDR module 322 may have 8, 16, or another quantity of receive chain set of elements. The combiner 310 may receive combiner row and column weights. For some embodiments, a complex multiply may be performed by the combiner 310 or the multiply accumulator 312. For example, an example combiner output signal may be calculated as shown in Eqn. 1.

$$\text{Combined}_{I,Q} = \Sigma_{r=0}^{r=N-1} (I_r + jQ_r)(w_{I_r} + jw_{Q_r}) \quad \text{Eq. 1}$$

where r=0, ..., N−1 for N sets of receive chains; $w_{I_r}$=the combiner I weight for a receive chain r; and $w_{Q_r}$=the combiner Q weight for a receive chain r. For some embodiments, row and column combiner weights may be received by the combiner 310 from a control bus 314, and a matrix of $\text{Combined}_{I,Q}$ values may be outputted by the combiner 310 and sent to the multiply accumulator (MAC) 312. The matrix of $\text{Combined}_{I,Q}$ values may be calculated using a matrix of respective row and column weights received by the control bus 314.

The MAC 312 may receive a summation of I signals ($\Sigma_I$), a summation of Q signals ($\Sigma_Q$), and/or a summation of I and Q signals ($\Sigma_{I,Q}$) for some embodiments. The MAC 312 also may receive a set of MAC row and column weights. The MAC 312 may perform a complex multiply and accumulation similar to Eq. 1 for a set of MAC weights in some embodiments. The MAC 312 may perform separate I and Q multiplications and accumulations for separate rows and columns according to some embodiments. The MAC 312 may output row and column accumulations that may be sent to the control bus 314. For some embodiments, the MAC accumulator outputs may correspond to distributed phase array signals or distributed beamform signals.

Figure 4:
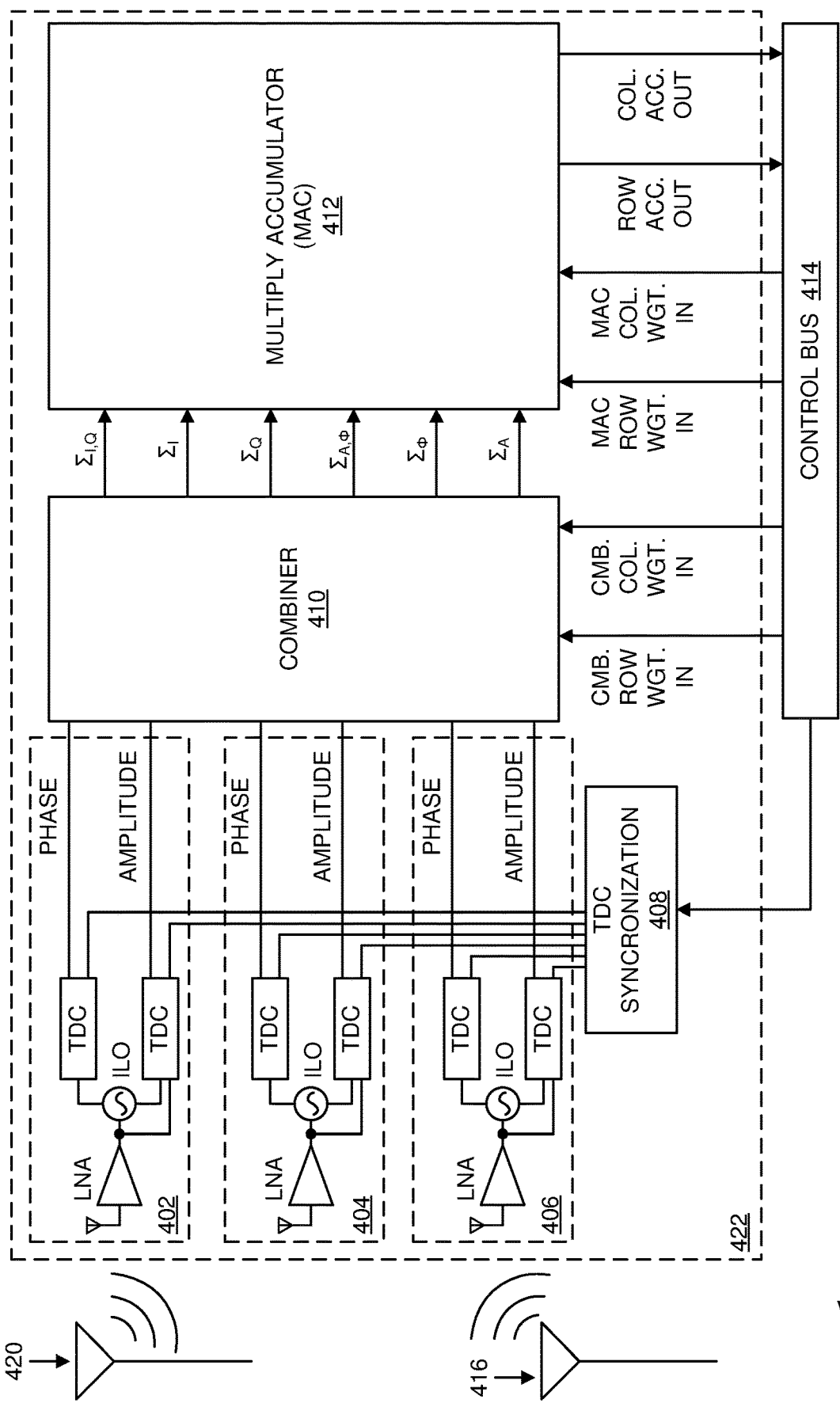
FIG. 4 is a block diagram illustrating block circuit connections for polar receiver chain elements according to some embodiments.

FIG. 4 is a block diagram 400 illustrating block circuit connections for polar receiver chain elements according to some embodiments. An oscillator control signal may be transmitted by an RF antenna 420, which may be common to one or more SDR modules, and received by a receive chain's antenna. The RF antenna 420 of FIG. 4 may be the same as the RF antenna 102 of FIG. 1 for some embodiments. For each receive chain sub-module 402, 404, 406, the received oscillator control signal may propagate through a linear noise amplifier (LNA) and be injected into an injection lock oscillator (ILO) circuit. The oscillator control signal may have a central carrier frequency that is substantially similar to a center frequency of a MIMO Rx channel. The ILO circuit may use the oscillator control signal received from a MIMO transceiver circuit board RF antenna 420 as part of a process to lock an oscillator associated with a receive chain sub-module 402, 404, 406. The ILO circuit may output phase and amplitude path signals for each receive chain sub-module 402, 404, 406. The ILO circuit output signals may be received by a time to digital converter (TDC) for the phase and amplitude paths. A TDC synchronization circuit 408 may receive synchronization signals from a control bus 414 for some embodiments. The TDC synchronization circuit 408 may send a synchronization signal to each TDC circuit associated with each receive chain sub-module 402, 404, 406 to synchronize the timing of TDC signals. Each receive chain sub-module 402, 404, 406 may have TDC circuits to generate phase information and amplitude information.

In some embodiments, the TDC uses the example technology described in U.S. patent application Ser. No. 15/488,278, entitled "TIME TO DIGITAL CONVERTER WITH INCREASED RANGE AND SENSITIVITY," filed on Apr. 14, 2017, and incorporated by reference herein. Other implementations may be used for the TDC.

For some embodiments of a receive chain sub-module 402, 404, 406, an RF antenna associated with a receive chain sub-module 402, 404, 406 may receive an OFDMA signal transmitted by an external transmitter/antenna 416. The external transmitter 416 may be a cell phone tower Tx antenna or a Tx antenna attached to a satellite, for example. The OFDMA receive signal may propagate through an LNA and may be mixed with an ILO output signal to shift the OFDMA receive signal down to baseband, for some embodiments. Phase and amplitude information may be extracted from an ILO circuit output signal. Phase and amplitude path signals may be received by a time-to-digital converter (TDC) for the phase and amplitude paths. A TDC synchronization circuit 408 may receive synchronization signals from a control bus 414 for some embodiments. The TDC synchronization circuit 408 may send a synchronization signal to each TDC circuit associated with each receive chain sub-module 402, 404, 406 to synchronize the timing of TDC signals. Each receive chain sub-module 402, 404, 406 may have TDC circuits to generate phase information and amplitude information for each receive chain sub-module 402, 404, 406.

For some embodiments, output signals of the TDC synchronization circuit 408 may be time-to-digital conversion (TDC) synchronization signals. Such TDC synchronization output signals may be received by TDC processing circuits for each receive chain sub-module 402, 404, 406 and processed to adjust the phase output signal of each receive chain sub-module 402, 404, 406. The phase of each transceiver module's phase output signal may be adjusted so as to align the phase of a receive carrier reference signal.

Some embodiments of the receive chain sub-module 402, 404, 406 (or transceiver module, such as the transceiver module 104 of FIG. 1), may include an injection-locked oscillator (ILO) that locks to the TDC synchronization circuit's synchronization output signal. The ILO of each receive chain sub-module 402, 404, 406 (or transceiver module) may generate a local downconversion signal that may be used to downconvert a desired received channel signal. For example, an LNA of a transceiver module may receive a modulated RF signal via an antenna, and the LNA may generate an output signal that is mixed with the ILO output signal. The local downconversion signal may be used to control the ILO so that the output of the mixed ILO signal is a downconverted signal for the desired received channel signal.

For some embodiments, the ILO may generate a local time-to-digital-converter (TDC) reference signal that may be used to synchronize a plurality of polar transceivers. For example, the local TDC signal of each receive chain sub-module 402, 404, 406 (or transceiver module) may be used to generate an output signal of each transceiver module's TDC processing circuit that may be used to synchronize receive signals received by each receive chain sub-module 402, 404, 406 (or transceiver module).

With some embodiments of the transceiver module, each transceiver module may include a plurality of polar receivers (such as receive chain sub-modules 402, 404, 406), wherein each polar receiver may include an injection-locked oscillator (ILO) that is tuned to lock onto the synchronization signal and adjust (or deviate) according to modulation present in the desired received signal.

A combiner 410 may receive phase and amplitude signals for each receive chain sub-module 402, 404, 406. The combiner 410 also may receive row and column weights from the control bus 414. While FIG. 4 shows three receive chains sub-modules 402, 404, 406, some embodiments of an SDR module 422 may have 8, 16, or another quantity of receive chain set of elements. The combiner 410 may receive combiner row and column weights. For some embodiments, amplitude and phase information may be converted into I and Q information. The conversion from amplitude and phase to I and Q may be performed with a CORDIC circuit, which may be internal to the combiner 410 for some embodiments. Some embodiments may use the I and Q information to calculate accumulated I and Q values, which may be similar to Eq. 1. For some embodiments, a complex multiply may be performed by the combiner 410 or the multiply accumulator 412. For some embodiments, row and column combiner weights may be received by the combiner 410 from a control bus 414, and a matrix of Combined$_{I,Q}$ values may be outputted by the combiner 410 and sent to the multiply accumulator (MAC) 412. The matrix of Combined$_{I,Q}$ values may be calculated using a matrix of respective row and column weights received by the control bus 414. For some embodiments, a signal combiner may be configured with a signal weighting factor. The signal weighting factor may be communicated to the combiner 410 with the combiner row weight in and combiner column row weight in signals. The signal weighting factor may be communicated to the MAC 412 with the MAC row weight in and MAC column weight in signals. With some embodiments, the signal weighting factor may include a beam forming weight. The beam forming weight may be a column weighting factor, a row weighting factor, or both a row and a column weight factor for some embodiments.

The MAC 412 may receive a summation of I signals ($\Sigma_I$), a summation of Q signals ($\Sigma_Q$), and/or a summation of I and Q signals ($\Sigma_{I,Q}$) for some embodiments. The MAC 412 also may receive a set of MAC row and column weights. The MAC 412 may perform a complex multiply and accumulation, e.g., similar to Eq. 1 for a set of MAC weights in some embodiments. The MAC 412 may perform separate I and Q multiplications and accumulations for separate rows and columns according to some embodiments. The MAC 412 may output row and column accumulations that may be sent to the control bus 414. For some embodiments, the MAC accumulator outputs may correspond to distributed phase array signals or distributed beamform signals. Some embodiments may sum amplitude and phase information separately without performing a complex multiplication.

Figure 5:
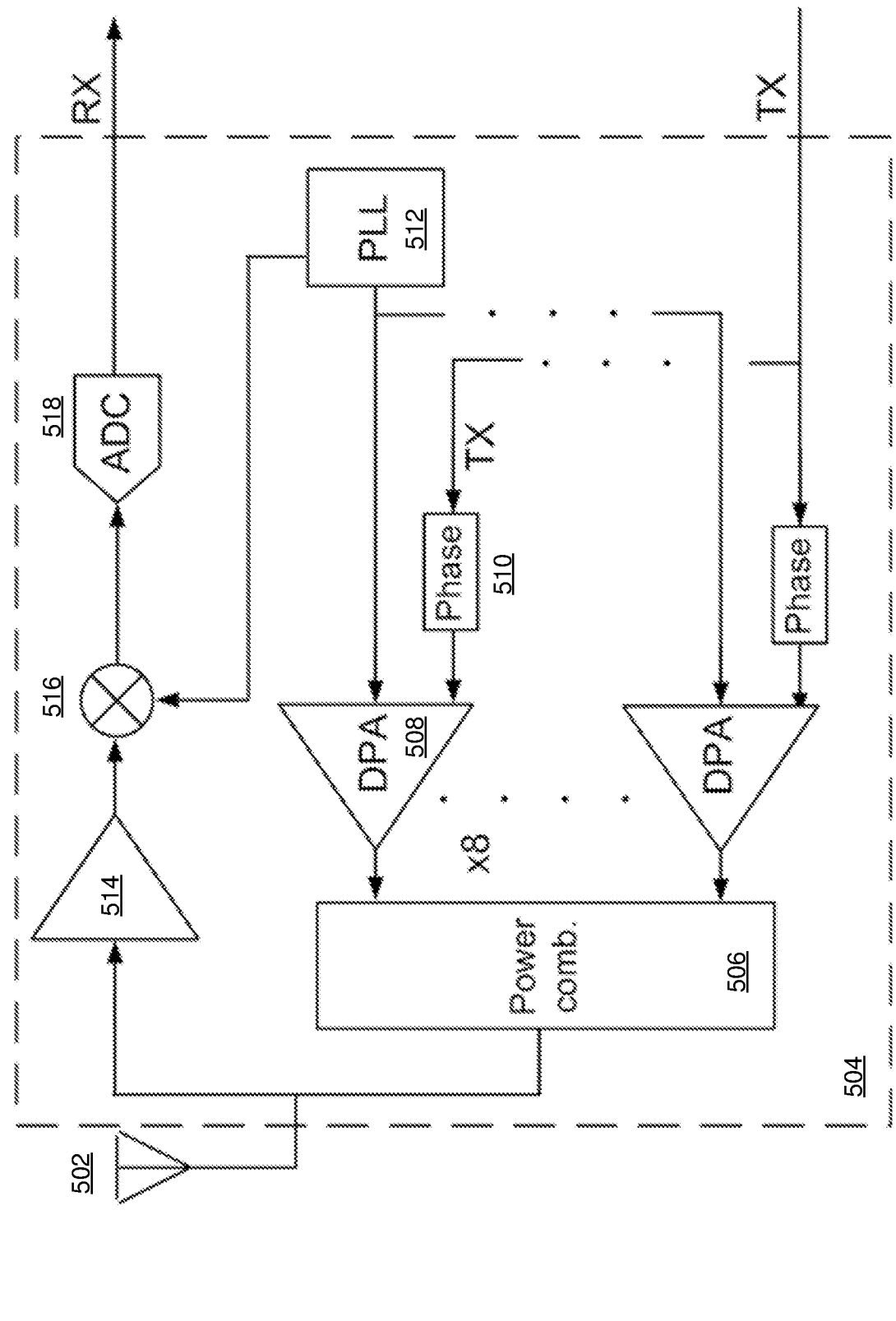
FIG. 5 is a block diagram illustrating block circuit connections for a transceiver with a power combiner for the Tx path components according to some embodiments.

FIG. 5 is a block diagram illustrating block circuit connections for a transceiver 500 with a power combiner for the Tx path components according to some embodiments. FIG. 5 shows an example configuration of an SDR module 504 with up to 8 transmit chain of elements and 1 receive chain of elements. Some embodiments of an SDR module 504 may include a different quantity of transmit and receive chains of elements.

For some embodiments, a Tx signal with phase information may be received by a phase circuit 510 for each transmit chain. A phase lock loop (PLL) circuit 512 may generate a signal to inject into a digital power amplifier (DPA) 508 for each transmit chain. Each transmit chain's DPA 508 may generate an amplified and modulated output signal using the phase and PLL input signals. Each transmit chain's amplified and modulated output signal may be injected into a power combiner. Each SDR module 504 may contain a power combiner 506. The digitally combined power signal may be transmitted by the transceiver via an RF antenna 502 associated connected to the SDR module 504.

For some embodiments, the power combiner 506 may be a Wilkinson combiner, and transmit modulated signals may be combined with the Wilkinson combiner. With some embodiments, the transmit modulated signals may be combined as electromagnetic energy (which may occur in the air between a transmitter and a receiver, for example) by connecting each power amplifier (such as the output of each digital power amplifier (DPA) 508) to one of a plurality of dipole antennas (such as the dipole antenna 502). For some embodiments, one or more transceiver modules (or transmit chain elements, which may include a DPA 508, a phase circuit 510, and a PLL circuit 512) may be configured with a weighting factor used for beam forming. The power combiner 506 (or a transceiver module 504) may receive weighting factors, such as row and column weight factors, that may be used to adjust power levels for beam forming of transmit signals.

In some embodiments, an Rx signal may be received by an RF antenna 502 associated with an SDR module 504. Some embodiments of a receive chain of components may have a linear noise amplifier (LNA) 514 that receives a modulated RF signal on an SDR module's 504 RF antenna 502. The output of the LNA 514 may injected into a mixer 516 and mixed with a PLL signal to generate an Rx path input signal. The output of the ILO 516 may be received by an analog to digital converter (ADC) 518. The ADC 518 may generate a receive output signal (RX).

In some embodiments, a transmit modulated signal may be generated from a transmit digital baseband signal at each transceiver using a digital modulator and a power amplifier and combining the transmit modulated signals. For example, an SDR module 504 may be generated by inputting a transmit signal TX into each phase circuit 510. The output of each phase circuit 510 may be inputted into a digital power amplifier (DPA) 508. Each DPA 508 may generate an input signal to a power combiner 506. The power combiner 506 may combine each of the DPA output signals to generate a transmit modulated signal.

Figure 6:
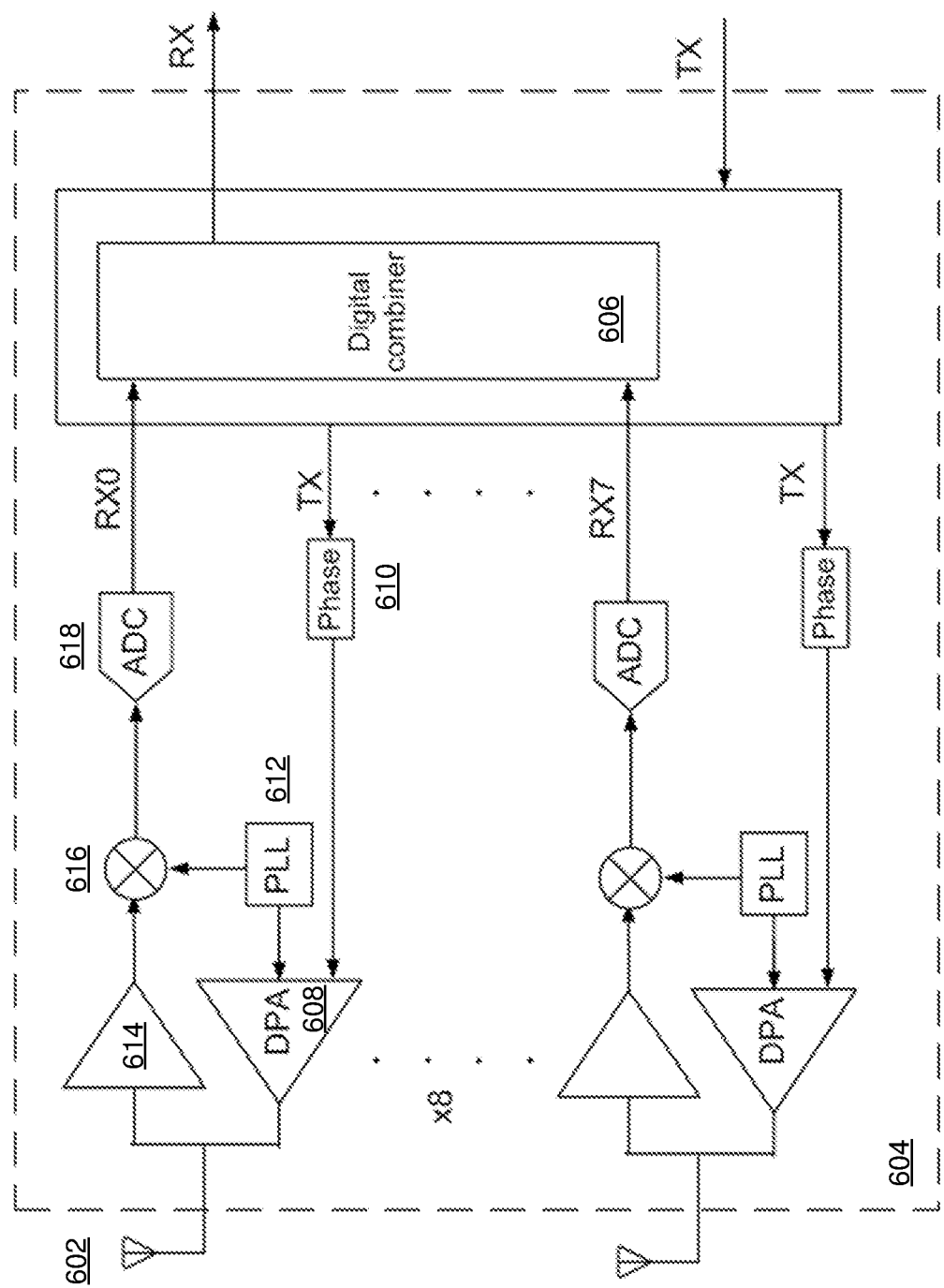
FIG. 6 is a block diagram illustrating block circuit connections for a transceiver with the Tx RF signals combining in the air according to some embodiments.

FIG. 6 is a block diagram illustrating block circuit connections for a transceiver 600 with the Tx RF signals combining in the air according to some embodiments. FIG. 6 shows an example configuration of an SDR module 604 with up to 8 transmit chain of elements and 8 receive chains of elements. Some embodiments of an SDR module 604 may include a different quantity of transmit and receive chains of elements.

For some embodiments, a Tx signal with phase information may be received by a phase circuit 610 for each transmit chain. A phase lock loop (PLL) circuit 612 may generate a signal to inject into a digital power amplifier (DPA) 608 for each transmit chain. Each transmit chain's DPA 608 may generate an amplified and modulated output signal using the phase and PLL input signals. Each transmit chain's amplified and modulated output signal may be transmitted by an RF antenna 602. Some embodiments may have a separate RF antenna 602 per transmit/receiver chain pair.

In some embodiments, an OFDMA modulated signal may be received by an RF antenna 602 associated with an SDR module 604. Some embodiments of a receive chain of components may have a linear noise amplifier (LNA) 614 that receives a modulated RF signal on an SDR module's 604 RF antenna 602. The output of the LNA 614 may injected into a mixer 616 and mixed with a PLL signal to generate an Rx path input signal. The output of the ILO 616 may be received by an analog to digital converter (ADC) 618. The ADC 618 may generate a receive output signal (RX). Each SDR module 604 may contain a power combiner 606 that may be used to combine each receive chain's Rx signal (RX0, RX1, . . . , RX7) to generate a combined RX signal. The digitally combined RX signal may be connected to other components on a transceiver circuit board.

For some embodiments, each transceiver module may include a plurality of polar receivers, and each polar receiver may include an injection locked oscillator. For example, an SDR module 604 may include a plurality of polar receivers, each of which may include, for example, a PLL circuit 612, an LNA 614, a mixer 616, and an ADC 618. Each of the plurality of polar receivers may include an injection locked oscillator, which may be part of a PLL circuit 612.

Figure 7:
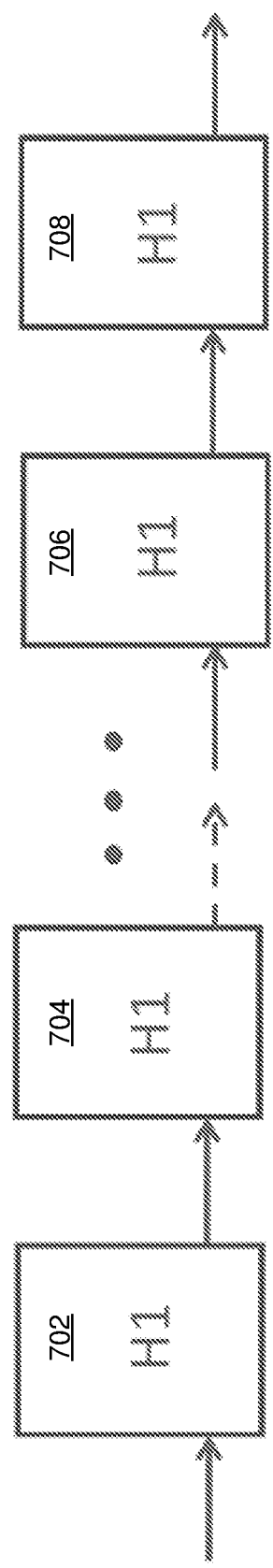
FIG. 7 is a block diagram illustrating block circuit connections for an array of integrated Software-Defined Radio (SDR) modules according to some embodiments.

FIG. 7 is a block diagram illustrating block circuit connections for an array of integrated Software-Defined Radio (SDR) modules 700 according to some embodiments. A phased array system may combine an RF modulated signal through weighting and summation of signals (such as I and Q receive data or amplitude and phase receive data). Each SDR module 702, 704, 706, 708 may include an integrated multiply-accumulator (MAC) to enable distributed combining. Such a configuration may enable scalability of a transceiver. Some embodiments may use different quantities of SDR modules 702, 704, 706, 708.

Figure 8:
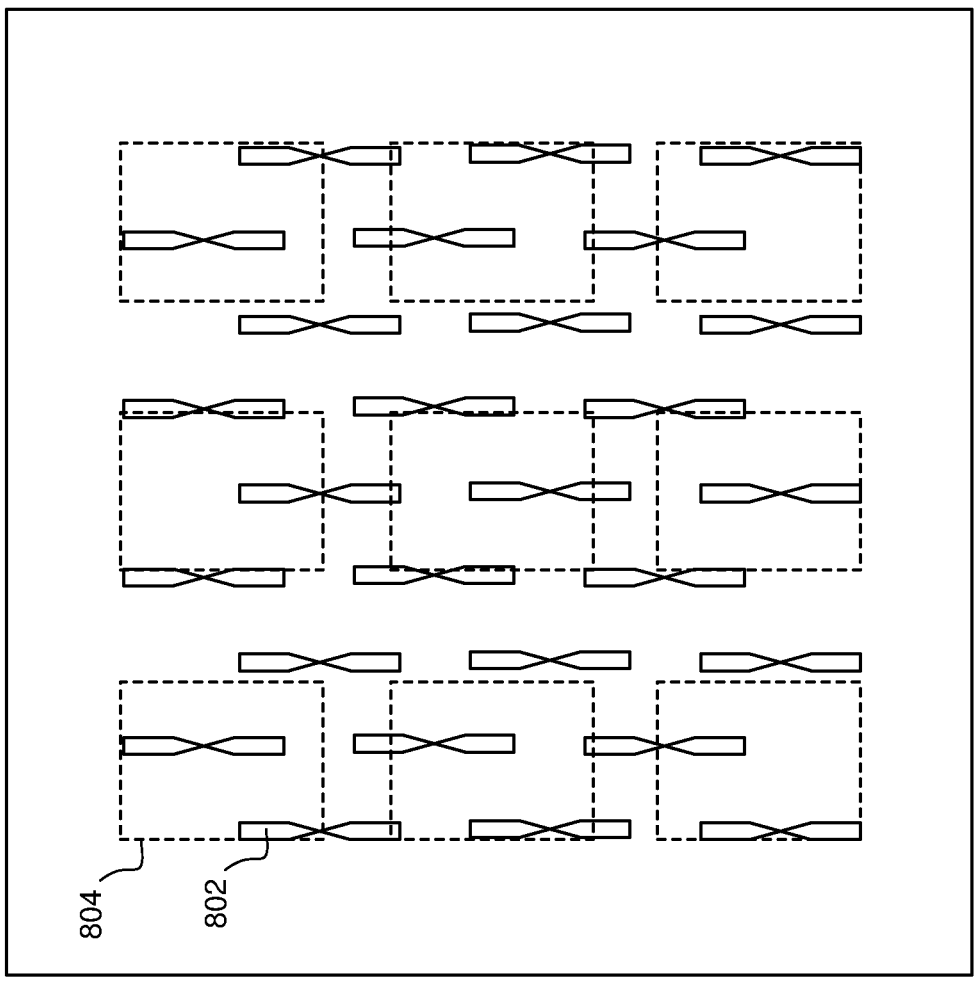
FIG. 8 is a schematic plan view illustrating an example configuration of dipoles superimposed with a 3×3 array of rectangular patches according to some embodiments.

FIG. 8 is a schematic plan view illustrating an example dipole configuration 800 with dipoles superimposed with a 3×3 array of rectangular patches according to some embodiments. FIG. 8 shows a configuration of staggered dipoles 802 and a 3×3 array of rectangular patches 804. A single microstrip patch 804 may be replaced with three planar dipole elements 802 that may fit within a similar size area as a single microstrip patch 804. For some embodiments, planar dipole elements may be used instead of microstrip patches. With some embodiments, a triplet of dipoles may be used per SDR module. Some embodiments may different sets of dipoles to adjust spacing between dipoles, such as to increase isolation between dipoles for example.

For some embodiments, a transmit modulated signal may be transmitted using a plurality of dipoles 802 connected to a transceiver module (such as the transceiver module 104 of FIG. 1) or a transmit chain sub-module, such as a transmit chain of elements shown in FIG. 5 (which may include a DPA 508, a phase circuit 510, and a PLL 512). With some embodiments, the plurality of dipoles 802 may be arranged as an array 804.

Figure 9:
FIG. 9 is a flowchart illustrating an example process for synchronizing a plurality of antenna array transceiver modules to align the phase of a receive carrier reference signal according to some embodiments.

FIG. 9 is a flowchart illustrating an example process 900 for synchronizing a plurality of antenna array transceiver modules to align the phase of a receive carrier reference signal according to some embodiments. For some embodiments, a method may include transmitting 902 a synchronization signal to a plurality of transceiver modules configured in an antenna array. Each transceiver module may process 904 the synchronization signal and responsively align a phase of a receive carrier reference signal. For example, the synchronization signal may be a time-to-digital conversion (TDC) synchronization signal as shown in FIG. 4. Such a TDC synchronization may be received by each module and processed to adjust the phase output signal of each receive chain sub-module (or transceiver module).

Figure 10:
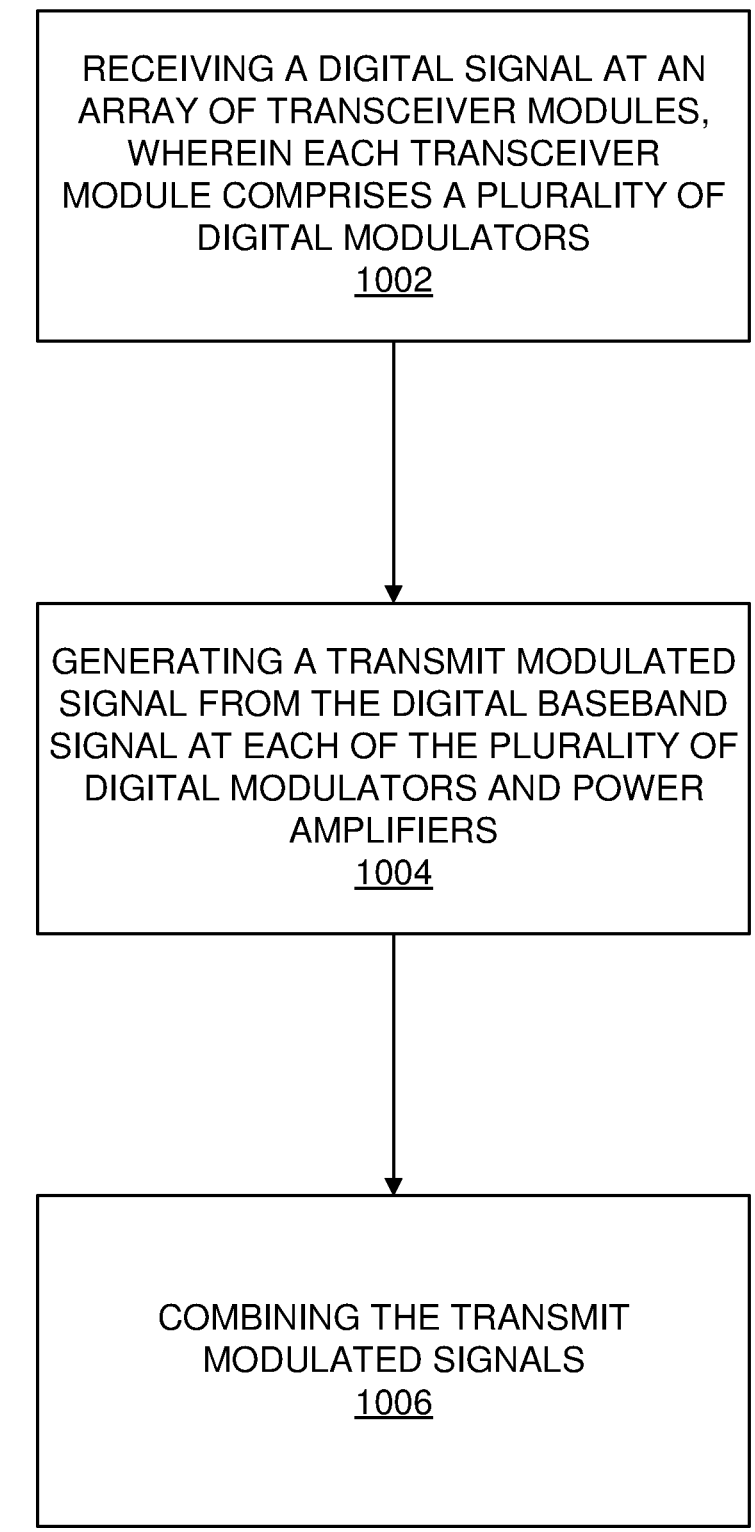
FIG. 10 is a flowchart illustrating an example process for generating and combining a plurality of transmit modulated signals according to some embodiments.

FIG. 10 is a flowchart illustrating an example process for generating and combining a plurality of transmit modulated signals according to some embodiments. A method 1000 may include receiving 1002 a digital baseband signal at an array of transceiver modules, wherein each transceiver module may include a plurality of digital modulators. The method 1000 also may include generating 1004 a transmit modulated signal from the digital baseband signal at each of the plurality of digital modulators and power amplifiers. The method 1000 may further include combining 1006 the transmit modulated signals, such as with a power combiner. The combined signal may be transmitted via an RF antenna.

Figure 11:
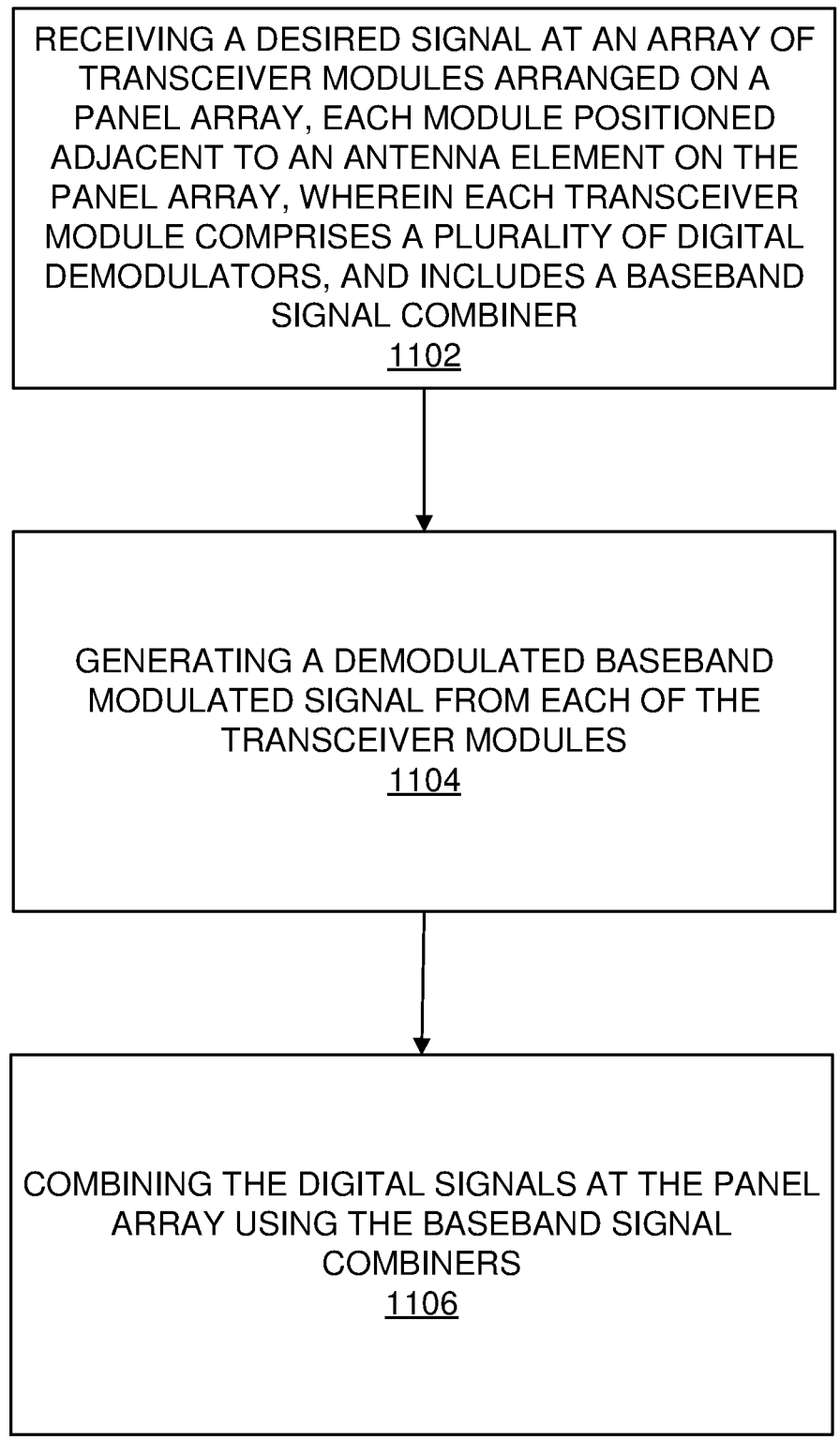
FIG. 11 is a flowchart illustrating an example process for demodulating a plurality of received modulated signals and combining baseband signals according to some embodiments.

FIG. 11 is a flowchart illustrating an example process 1100 for demodulating a plurality of received modulated signals and combining baseband signals according to some embodiments. A method 1100 may include receiving 1102 a desired signal at an array of transceiver modules arranged on a panel array, with each module positioned adjacent to an antenna element on the panel array, wherein each transceiver module may include a plurality of digital demodulators, and may include a baseband signal combiner. The method 1100 also may include generating 1104 a demodulated baseband modulated signal from each of the transceiver modules. The method 1100 may further include combining the digital baseband signals at the panel array using the baseband signal combiners, such as the digital combiner of FIG. 6.

Figure 12:
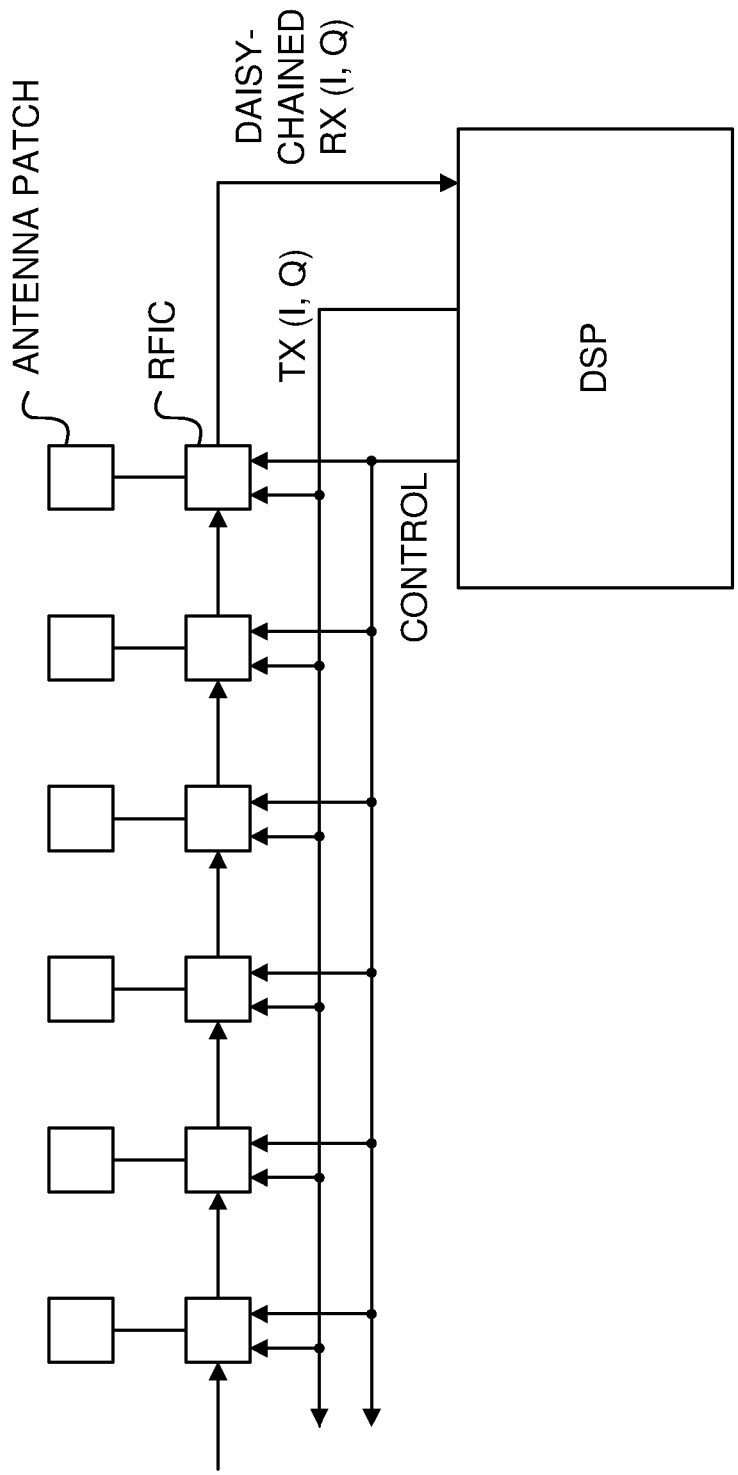
FIG. 12 is an example diagram showing an antenna array according to some embodiments.

FIG. 12 is an example diagram showing an antenna array according to some embodiments. In some embodiments, the example antenna array portion is part of a variable sub-array that includes transceiver elements. The antenna array portion 1200 may include multiple transceiver elements. Rx signals may be received via a plurality of antenna patch elements. Rx signals may be daisy-chained together and communicated between each transceiver element via an Rx serial bus. A DSP may be connected to the Rx serial bus and may receive a summed Rx signal that has been weighted and summed by each transceiver element. Modulated Tx signals may be received by each transceiver element from a DSP via the Tx serial bus. Control data may be received by each transceiver element from a DSP to control the Rx and Tx circuit elements within each transceiver element. Weighted and summed Rx signals may be in I and Q format for some embodiments. Weighted and summed Rx signals also may be in polar format for some embodiments. Similarly, modulated Tx signals may be in I and Q format for some embodiments and in polar format for some embodiments.

For some embodiments, a transceiver may perform a process that includes obtaining a plurality of transmit digital baseband signals at the antenna array for transmission by the antenna array; distributing each transmit digital baseband signal to a respective plurality of transceiver modules; and applying a transmit signal weighting factor of the assigned signal weighting factors to the transmit digital baseband signal at each respective transceiver module. For example, a transmit digital baseband signal may be generated for transmission by an antenna array, such as the antenna patch array shown in FIG. 12. The transmit digital baseband signal may distributed to a respective plurality of transceiver modules, such as each RFIC chip of the array of RFIC chips shown in FIG. 12. A transmit weighting factor may be applied by each transceiver module. Each weighting factor may be assigned to a particular transceiver module.

Figure 13:
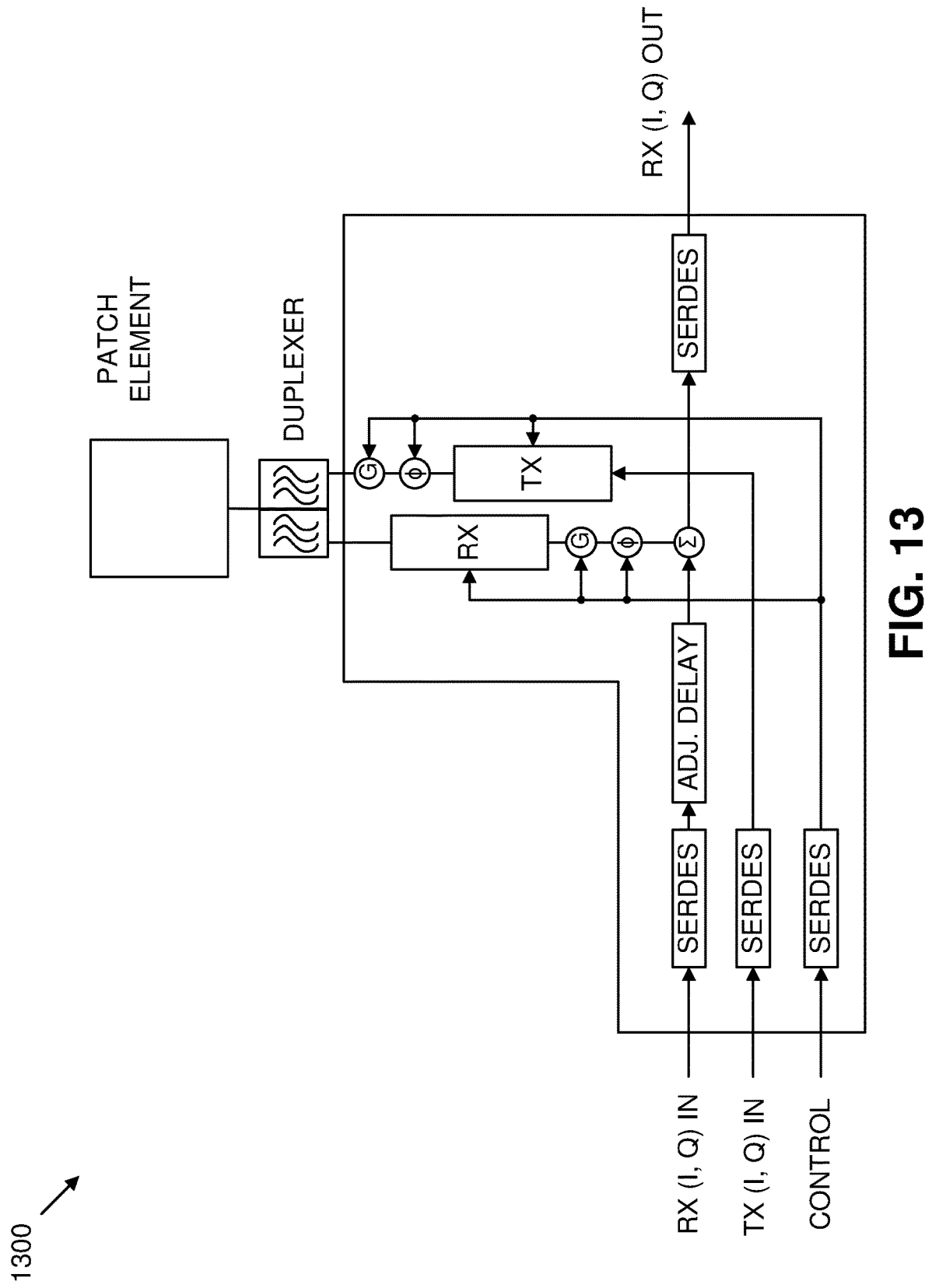
FIG. 13 is an example diagram showing an example transceiver element according to some embodiments.

FIG. 13 is an example diagram showing an example transceiver element according to some embodiments. FIG. 13 shows one example circuit implementation of a transceiver element 1300. The example transceiver element 1300 may have separate serial data buses for Rx, Tx, and control data. Rx and Tx signals may be received by the transceiver element 1300 as shown on the left side of FIG. 13. Rx and Tx weightings also may be received by the control data input shown on the left side of FIG. 13, Serialized/deserialized (SERDES) circuit elements may be used to convert between serial and parallel input data. Rx and Tx weightings may be in complex I and Q (in-phase and quadrature) format for some embodiments. Rx and Tx weightings also may be in polar (amplitude and phase) format for some embodiments. Control data also may include time delay settings. Time delay settings and Tx weightings may be configured to enable a plurality of transmitter circuit elements to be arranged for beamforming for communication with one or more satellites. Similarly, time delay settings and Rx weightings may be configured to enable a plurality of receiver elements to be arranged to receive an array of modulated signals from a satellite. RF signals may be received from a satellite via a patch element. The received signal may go through a duplexer and be received at the input to the Rx circuit element shown in FIG. 13. The Rx circuit element may be controlled by data received on the control serial bus input line. The output of the Rx element may be weighted and summed with Rx data received on the Rx serial bus input line. An adjustable delay may be configured to delay Rx signal data received by the Rx serial bus. Summed Rx signals may be processed by a SERDES circuit element to convert the de-serialized Rx signal data into serial data format. The Rx serial bus data may be outputted via the Rx serial bus output. Similarly, modulated Tx signal data may be received by the Tx serial bus input. The modulated Tx signal data may be inputted into the Tx circuit element. The Tx circuit element may be controlled by data received by the control data bus. The output of the Tx circuit element may be weighted in I and Q format for some embodiments. Some embodiments may weight the output of the Tx circuit element in polar format. Weighted Tx signals may be sent to the duplexer and transmitted to a satellite via the patch element. For some embodiments, each transceiver module may include a plurality of polar transmitters, such as the polar transmitter shown in FIG. 13.

FIG. 14 is a flowchart illustrating an example process for configuring a transceiver according to some embodiments. For some embodiments, a transceiver may perform an example process 1400 that includes configuring 1402 a plurality of transceiver modules in an antenna array with assigned receive signal weighting factors, the transceiver modules interconnected with high-speed data communication buses, and each transceiver module positioned adjacent to a respective antenna element in the antenna array. The process 1400 performed by the transceiver may further include configuring 1404 the plurality of transceiver modules into inter-communicating module groups by enabling the associated high-speed data communication buses. The process 1400 performed by the transceiver may further include receiving 1406 a plurality of wireless data signals with the plurality of transceiver modules and responsively generating a corresponding plurality of receive baseband data signals. The process 1400 performed by the transceiver may further include generating 1408 a plurality of received beamformed signals by combining subsets of the receive baseband signals within each module group using the assigned receive signal weighting factors by transmitting the receive baseband signals between the transceiver modules within the module group. The process 1400 performed by the transceiver may further include demodulating 1410 the received beamformed signals.

For some embodiments, an example apparatus may include: a plurality of transceiver modules in an antenna array, each transceiver having an assigned receive signal weighting factor, each transceiver module positioned adjacent to a respective antenna element in the antenna array; a plurality of high-speed data communication buses connected to the plurality of transceiver modules; a controller configured to transmit control signals to group the transceiver modules into inter-communicating module groups; a plurality of accumulators associated with the transceiver module groups configured to receive a plurality of receive baseband data signals and to apply the assigned receive signal weighting factors to form receive beamformed signals; and a demodulator configured to demodulate the received beamformed signals. An example of such an apparatus may be as shown in FIGS. 12 and 13.

An example method in accordance with some embodiments may include: configuring a plurality of transceiver modules in an antenna array with assigned receive signal weighting factors, the transceiver modules interconnected with high-speed data communication buses, and each transceiver module positioned adjacent to a respective antenna element in the antenna array; configuring the plurality of transceiver modules into inter-communicating module groups by enabling the associated high-speed data communication buses; receiving a plurality of wireless data signals with the plurality of transceiver modules and responsively generating a corresponding plurality of receive baseband data signals; generating a plurality of received beamformed signals by combining subsets of the receive baseband signals within each module group using the assigned receive signal weighting factors by transmitting the receive baseband signals between the transceiver modules within the module group; and demodulating the received beamformed signals.

For some embodiments of the example method, each transceiver module may include a plurality of polar transmitters.

For some embodiments of the example method, each transceiver module may include a plurality of polar receivers, and wherein each polar receiver includes an injection locked oscillator.

Some embodiments of the example method may further include: obtaining a plurality of transmit digital baseband signals at the antenna array for transmission by the antenna array; distributing each transmit digital baseband signal to a respective plurality of transceiver modules; and applying a transmit signal weighting factor of the assigned signal weighting factors to the transmit digital baseband signal at each respective transceiver module.

Some embodiments of the example method may further include: generating a transmit modulated signal from the transmit digital baseband signal at each transceiver using a digital modulator and power amplifier; and combining the transmit modulated signals.

For some embodiments of the example method, the transmit modulated signals are combined with a Wilkinson combiner.

An example additional method in accordance with some embodiments may include: receiving a desired signal at an array of transceiver modules arranged on a panel array, each module positioned adjacent to an antenna element on the panel array, wherein each transceiver module comprises a plurality of digital demodulators, which may include a baseband signal combiner; generating a demodulated baseband modulated signal from each of the transceiver modules; and combining the digital baseband signals at the panel array using the baseband signal combiners.

For some embodiments of the example additional method, the signal combiners may be configured by a signal weighting factor.

For some embodiments of the example additional method, the signal weighting factor may include a beam forming weight.

For some embodiments of the example additional method, the beam forming weight may be a column weighting factor, a row weighting factor, or both.

An example apparatus in accordance with some embodiments may include: a plurality of transceiver modules in an antenna array, each transceiver having an assigned receive signal weighting factor, each transceiver module positioned adjacent to a respective antenna element in the antenna array; a plurality of high-speed data communication buses connected to the plurality of transceiver modules; a controller configured to transmit control signals to group the transceiver modules into inter-communicating module groups; a plurality of accumulators associated with the transceiver module groups configured to receive a plurality of receive baseband data signals and to apply the assigned receive signal weighting factors to form receive beamformed signals; and a demodulator configured to demodulate the received beamformed signals.

For some embodiments of the example apparatus, each transceiver module may include a plurality of polar transmitters.

For some embodiments of the example apparatus, each transceiver module may include a plurality of polar receivers, and wherein each polar receiver includes an injection locked oscillator.

Some embodiments of a method may include: transmitting a synchronization signal to a plurality of transceiver modules configured in an antenna array; and each transceiver module processing the synchronization signal and responsively aligning a phase of a receive carrier reference signal.

In some embodiments of a method, each transceiver module may include an injection locked oscillator (ILO) that locks to the synchronization signal.

With some embodiments of a method, the ILO may generate a local downconversion signal used to downconvert a desired received channel signal.

In some embodiments of a method, the ILO may generate a local time-to-digital-converter (TDC) reference signal used to synchronize a plurality of polar transceivers.

In some embodiments of a method, each transceiver module may include a plurality of polar receivers, wherein each polar receiver includes an injection locked oscillator that is tuned to lock onto the synchronization signal, and deviate according to modulation present in the desired received signal.

Some embodiments of a method may include: receiving a digital baseband signal at an array of transceiver modules, wherein each transceiver module may include a plurality of digital modulators; generating a transmit modulated signal from the digital baseband signal at each of the plurality of digital modulators and power amplifiers; and, combining the transmit modulated signals.

In some embodiments of a method, the transmit modulated signals may be combined with a Wilkinson combiner.

With some embodiments of a method, the transmit modulated signals may be combined as electromagnetic energy by connecting each power amplifier to one of a plurality of dipole antennas.

In some embodiments of a method, the plurality of dipole antennas may be arranged in an array.

For some embodiments of a method, one or more transceiver modules may be configured with a weighting factor used for beam forming.

Some embodiments of a method may include receiving a desired signal at an array of transceiver modules arranged on a panel array, each module positioned adjacent to an antenna element on the panel array, wherein each transceiver module may include a plurality of digital demodulators, and may include a baseband signal combiner; generating a demodulated baseband modulated signal from each of the transceiver modules; and combining the digital baseband signals at the panel array using the baseband signal combiners.

In some embodiments of a method, the signal combiners may be configured by a signal weighting factor.

In some embodiments of a method, the signal weighting factor may include a beam forming weight.

In some embodiments of a method, the beam forming weight may be a column weighting factor, a row weighting factor, or both.

Some embodiments of an apparatus may include: a plurality of transceiver modules configured in an antenna array; a synchronization transmission circuit configured to transmit a synchronization signal to the plurality of transceiver modules; a receive carrier generation circuit configured to generate a receive carrier reference signal; and a synchronization processing circuit configured to process the synchronization signal and to align a phase of the receive carrier reference signal.

Some embodiments of an apparatus may include: a plurality of transceiver modules arranged in an array and configured to receive a digital baseband signal; a plurality of digital modulators and power amplifiers each configured to generate a transmit modulated signal from the digital baseband signal; and a combiner configured to combine the transmit modulated signals.

Some embodiments of an apparatus may include: a plurality of antenna elements on a panel array; a plurality of transceiver modules arranged on the panel array to be adjacent to one of the plurality of antenna elements and configured to receive a desired signal, wherein each transceiver module may include a plurality of digital demodulators, and includes a baseband signal combiner; a demodulation circuit configured to generate a demodulated baseband signal from each of the transceiver modules; and a combiner configured to combine the digital baseband signals at the panel array using the baseband signal combiners.

In the foregoing specification, specific embodiments have been described. However, one of ordinary skill in the art would appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about", or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Accordingly, some embodiments of the present disclosure, or portions thereof, may combine one or more processing devices with one or more software components (e.g., program code, firmware, resident software, micro-code, etc.) stored in a tangible computer-readable memory device, which in combination form a specifically configured apparatus that performs the functions as described herein. These combinations that form specially programmed devices may be generally referred to herein as "modules." The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that separate processor devices and/or computing hardware platforms perform the described functions.

Moreover, an embodiment can be implemented as a computer-readable storage medium having computer readable code stored thereon for programming a computer (e.g., comprising a processor) to perform a method as described and claimed herein. Examples of such computer-readable storage media include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method comprising:
configuring a plurality of transceiver modules in an antenna array with assigned receive signal weighting factors, the transceiver modules serially interconnected with high-speed data communication buses, and each transceiver module being collocated on an antenna array panel and positioned adjacent to a respective antenna element also positioned on in the antenna array panel;

configuring the plurality of transceiver modules into serially-inter-communicating module groups by enabling the associated high-speed data communication buses;

receiving a plurality of wireless data signals with the plurality of transceiver modules and responsively generating a corresponding plurality of receive baseband data signals;

generating a plurality of received beamformed signals by combining subsets of the receive baseband signals within each module group using the assigned receive signal weighting factors by transmitting the receive baseband signals between the transceiver modules within the module group; and demodulating the received beamformed signals.

2. The method of claim 1, wherein each transceiver module includes a plurality of polar transmitters.

3. The method of claim 1, wherein each transceiver module includes a plurality of polar receivers, and wherein each polar receiver includes an injection locked oscillator.

4. The method of claim 1 further comprising:

configuring the plurality of transceiver modules with assigned transmit signal weighting factors;

obtaining a plurality of transmit digital baseband signals at the antenna array for transmission by the antenna array;

distributing each transmit digital baseband signal to a respective plurality of transceiver modules; and applying the transmit signal weighting factor to the transmit digital baseband signal at each respective transceiver module.

5. The method of claim 4 further comprising:

generating a transmit modulated signal from the transmit digital baseband signal at each transceiver using a digital modulator and power amplifier; and combining the transmit modulated signals.

6. The method of claim 5, wherein the transmit modulated signals are combined with a Wilkinson combiner.

7. A method comprising:

receiving a desired signal at an array of serially-connected transceiver modules arranged on a panel array, each module positioned adjacent to an antenna element on the panel array, wherein each transceiver module comprises a plurality of digital demodulators, and includes a baseband signal combiner;

generating a demodulated baseband modulated signal from each of the transceiver modules; and transmitting the demodulated baseband signals between the transceiver modules and combining the digital baseband signals at the panel array using the baseband signal combiners within individual transceiver modules.

8. The method of claim 7, wherein the signal combiners are configured by a signal weighting factor.

9. The method of claim 8, wherein the signal weighting factor comprises a beam forming weight.

10. The method of claim 9, wherein the beam forming weight is a column weighting factor, a row weighting factor, or both.

11. An apparatus comprising:

a plurality of transceiver modules in an antenna array, each transceiver having an assigned receive signal weighting factor, each transceiver module positioned adjacent to a respective antenna element in the antenna array;

a plurality of high-speed data communication buses configured to serially connect groups of the plurality of transceiver modules;

a controller configured to transmit control signals to group the transceiver modules into inter-communicating module groups;

a plurality of accumulators associated with the transceiver module groups configured to receive a plurality of receive baseband data signals and to apply the assigned receive signal weighting factors to form receive beamformed signals; and a demodulator configured to demodulate the received beamformed signals.

12. The apparatus of claim 11, wherein each transceiver module includes a plurality of polar transmitters.

13. The apparatus of claim 11, wherein each transceiver module includes a plurality of polar receivers, and wherein each polar receiver includes an injection locked oscillator.

* * * * *